(12) United States Patent
    Li

(10) Patent No.: US 10,700,928 B2
(45) Date of Patent: Jun. 30, 2020

(54) METHOD AND APPARATUS FOR DEPLOYING SERVICE IN VIRTUALIZED NETWORK

(71) Applicant: HUAWEI TECHNOLOGIES CO., LTD., Shenzhen, Guangdong (CN)

(72) Inventor: Shitao Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/244,592

(22) Filed: Jan. 10, 2019

(65) Prior Publication Data

US 2019/0149408 A1 May 16, 2019

Related U.S. Application Data

(63) Continuation of application No. PCT/CN2017/090891, filed on Jun. 29, 2017.

(30) Foreign Application Priority Data

Aug. 5, 2016 (CN) .......................... 2016 1 0643597

(51) Int. Cl.
    *G06F 15/173* (2006.01)
    *H04L 12/24* (2006.01)
    *H04L 12/46* (2006.01)
(52) U.S. Cl.
    CPC ...... *H04L 41/0806* (2013.01); *H04L 12/4641* (2013.01); *H04L 41/0886* (2013.01);
    (Continued)
(58) Field of Classification Search
    USPC ....................................................... 709/223
    See application file for complete search history.

(56) References Cited

U.S. PATENT DOCUMENTS

2015/0142940 A1   5/2015   McMurry et al.
2017/0288983 A1  10/2017   Li

FOREIGN PATENT DOCUMENTS

CN      104954220 A    9/2015
CN      105634782 A    6/2016
                (Continued)

OTHER PUBLICATIONS

ETSI GS NFV-MAN 001 V1.1.1 (Dec. 2014), Network Functions Virtualisation (NFV);Management and Orchestration. 184 pages.
(Continued)

*Primary Examiner* — Anthony Mejia
(74) *Attorney, Agent, or Firm* — Fish & Richardson P.C.

(57) ABSTRACT

A method for deploying a service in a virtualized network is described. A virtualized network function manager receives an instantiation request including a virtualized network function (VNF) instance identifier and a first deployment flavour identifier; obtains a VNF deployment template (VNFD) including description information of at least two potential deployment nodes and description information of at least two deployment flavours, description information of each potential deployment node includes node information and a deployment condition of the potential deployment node, and description information of each deployment flavour includes deployment information of a to-be-deployed node corresponding to the deployment flavour; determines node information and deployment information of a to-be-deployed node based on the first deployment flavour identifier and the VNFD; and sends the determined node information and deployment information of the to-be-deployed node to a virtualized infrastructure manager.

11 Claims, 9 Drawing Sheets

(52) U.S. Cl.
CPC ........ *H04L 41/5054* (2013.01); *H04L 41/082* (2013.01); *H04L 41/5045* (2013.01)

(56) References Cited

FOREIGN PATENT DOCUMENTS

| | | |
|---|---|---|
| CN | 105765906 A | 7/2016 |
| CN | 105791147 A | 7/2016 |
| EP | 2955631 A1 | 12/2015 |
| WO | 2016070609 A1 | 5/2016 |
| WO | 2016101780 A1 | 6/2016 |

OTHER PUBLICATIONS

Oasis, Tosca Simple Profile for Network Functions Virtualization (NFV) Version 1.0, Committee Specification Draft 03, tosca-nfv-v1.0-csd03, Mar. 17, 2016, 51 pages.

International Search Report and Written Opinion issued in International Application No. PCT/CN2017/090891 dated Sep. 27, 2017, 13 pages.

DOCOMO Communications Lab, "IFA008 7.2 Adding LCM operation occurrence identifier (Mirror)," NFVIFA(16) 000323r3, XP014286685, dated Apr. 28, 2016, 16 pages.

ETSI Draft, "NFVIFA(15)000486 IFA004 Infrastructure VR outer acceleration," XP014260508, dated Apr. 10, 2015, 12 pages.

Extended European Search Report issued in European Application 17836241.4 dated Apr. 18, 2019, 12 pages.

Office Action issued in Chinese Application No. 201610643597.0 dated Apr. 18, 2019, 14 pages (with English translation).

Office Action issued in Chinese Application No. 201610643597.0 dated Jan. 20, 2020, 6 pages (with English ranslation).

METHOD AND APPARATUS FOR DEPLOYING SERVICE IN VIRTUALIZED NETWORK

CROSS-REFERENCE TO RELATED APPLICATIONS

This application is a continuation of International Application No. PCT/CN2017/090891, filed on Jun. 29, 2017, which claims priority to Chinese Patent Application No. 201610643597.0, filed on Aug. 5, 2016, The disclosures of the aforementioned applications are hereby incorporated by reference in their entireties.

TECHNICAL FIELD

The present invention relates to the field of information technologies, and in particular, to a method and an apparatus for deploying a service in a virtualized network.

BACKGROUND

Network functions virtualization (Network Functions Virtualization, NFV) uses a general-purpose hardware device and a virtualization technology to bear a function of a dedicated device in a traditional network, to reduce high costs caused by deployment of the dedicated device. Software is not bound to dedicated hardware, so that a network device function no longer depends on the dedicated hardware. In addition, relying on a characteristic of cloud computing, resources can be shared fully and flexibly to implement quick development and deployment of a new service, and automatic deployment, scaling, fault isolation, self-healing, and the like are performed based on an actual service requirement. In an NFV architecture, a party that receives an instantiation request and processes instantiation of a corresponding service (deploys the service) based on the request is referred to as a provider of a virtualized service (service provider for short), and a party that initiates the instantiation request is referred to as a service requester.

A virtualized network service (Network Service, NS) in NFV may be, for example, an IP multimedia subsystem (IP Multimedia Subsystem, IMS) network service or an evolved packet core (Evolved Packet Core, EPC) service. One NS may include several virtualized network function (Virtualized Network Function, VNF) modules, also referred to as virtualized network elements. During virtualization deployment of an NS, a service requester first needs to submit a descriptor of the network service (Network Service descriptor, NSD) to a service provider. The network service descriptor is also referred to as an NS deployment template, mainly including topology structure information of a topology structure of the network service and descriptors of VNFs (VNF descriptor, VNFD) included in the network service. In the topology structure information, virtual link descriptors VLDs (virtual link descriptor) are used to describe links between the VNFs. A VNFD is a descriptor of a VNF, and is also referred to as a deployment template of the VNF. The VNFD includes information about a virtualization deployment unit VDU (Virtualization Deployment Unit), a connection point CP (connection point), a virtual link VL (virtual link), and the like that are included in the described VNF. The VDU may represent a virtual machine on which application software is installed. A description of the VDU includes a description of a requirement of the VDU on a virtual resource of the virtual machine. The CP represents connection information of the virtual machine, for example, virtual network adapter information, and may be represented by an IP address or a MAC address. The VL is a virtual link, in the VNF, that connects a plurality of VDUs, and may be represented by information such as bandwidth and QoS.

Among prior-arts, a YAML (Yet Another Markup Language) model defined by using the TOSCA standard may be used to describe a VNF deployment template (VNFD). Specifically, the VNFD may be described by using a TOSCA service template (service template). For example, the following is a deployment template of a router VNF:

Code (1)

```
tosca_definitions_version:        tosca_simple_profile_for_nfv_1_0
topology_template:
  inputs:
    substitution_mappings:        # Describe which CPs act as external connection points to
                                  connect to external networks.
      node_type: tosca.nodes.nfv.VNF.VNF2
      requirements:
        virtualLink: [CP4, virtualLink]   # Information about a specified external
                                          connection point
        virtualLink: [CP6, virtualLink]   # Information about a specified external
                                          connection point
    node_templates:
      VDU1:                               # Node identifier and node
                                          information of VDU1
        type: tosca.nodes.nfv.VDU
        requirements:
          - host:                         # Requirement on a virtual machine
            properties:
              num_cpus: { equal: 2 }
              mem_size: { greater_or_equal: 2 GB}
            Capabilities:                 # Information about a scalable quantity
                                          of instances
              scalable:
                properties:
                  min_instances: 10       # Minimum quantity of instances: 10
                  max_instances: 20       # Maximum quantity of instances: 20
      VDU2:
        type: tosca.nodes.nfv.VDU
        requirements:
          - host:
```

-continued

| Code (1) |
|---|

```
            properties:
                num_cpus: { equal: 2 }
                mem_size: { greater_or_equal: 2 GB}
            Capabilities:              # Information about a scalable quantity
                                          of instances
                scalable:
                    properties:
                        min_instances: 10      # Minimum quantity of instances: 10
                        max_instances: 20      # Maximum quantity of instances: 20
VDU3:
            type: tosca.nodes.nfv.VDU
            requirements:
                - host:
                    properties:
                        num_cpus: { equal: 2 }
                        mem_size: { greater or equal: 2 GB}
            Capabilities:              # Information about a scalable quantity
                                          of instances
                scalable:
                    properties:
                        min_instances: 10      # Minimum quantity of instances: 10
                        max_instances: 20      # Maximum quantity of instances: 20
CP1:                                   # Deployment information of CP1
            type: tosca.nodes.nfv.CP
            requirements:
                virtualbinding: VDU1       # CP1 is attached to VDU1 and is
                                              connected to VL1.
                virtualLink: VL1
CP2:                                   # Deployment information of CP2
            type: tosca.nodes.nfv.CP
            requirements:
                virtualbinding: VDU1
                virtualLink: VL2
CP3
            type: tosca.nodes.nfv.CP
            requirements:
                virtualbinding: VDU2
                virtualLink: VL1
CP4
            type: tosca.nodes.nfv.CP
            requirements:
                virtualbinding: VDU2
CP5
            type: tosca.nodes.nfv.CP
            requirements:
                virtualbinding: VDU3
                virtualLink: VL2
CP6
            type: tosca.nodes.nfv.CP
            requirements:
                virtualbinding: VDU3
VL1
            type: tosca.nodes.nfv.VL.ELAN
            properties:
                # omitted here for brevity
            capabilities:
                -virtual_linkable
                    occurrences: 5
VL2
            type: tosca.nodes.nfv.VL.ELAN
            properties:
                # omitted here for brevity
            capabilities:
                -virtual_linkable
                    occurrences: 5
```

An example diagram of the deployment template of the corresponding VNF may be obtained based on the foregoing VNFD, as shown in FIG. 1. The VNF described by the code (1) includes three VDUs: the VDU1, the VDU2, and the VDU3, six CPs from the CP1 to the CP6, and two VLs: the VL1 and the VL2. The code virtualbinding: VDU1 and the code virtualLink: VL1 that are included in the CP1 indicate that the CP1 is attached to the VDU1 and connected to the VL1. The code virtualbinding: VDU1 and the code virtual- Link: VL2 that are included in the CP2 indicate that the CP2 is attached to the VDU1 and connected to the VL2. Similarly, the code included in the CP3 indicates that the CP3 is attached to the VDU2 and connected to the VL1, and the code included in the CP4 indicates that the CP4 is attached to the VDU2, the code included in the CP5 indicates that the CP5 is attached to the VDU3 and connected to the VL2, and the code included in the CP6 indicates that the CP6 is attached to the VDU3. The code virtualLink: [CP4, virtual- Link] and the code virtualLink: [CP6, virtualLink] indicate that the CP4 and the CP6 act as external connection points of the VNF to connect to external networks.

In practical application, there is a requirement of selecting different VDUs and VLs from a VNFD for deployment depending on different deployment requirements, instead of deploying all VDUs and VLs in the VNFD for whatever application. For example, in the previously described router instance, the VNFD may include two deployment flavours. A first deployment flavour includes the VDU1, the VDU2, and the VL1, and a second deployment flavour includes the VDU1, the VDU2, the VDU3, the VL1, and the VL2, and the VDU3 may be a firewall module. When the router VNF is deployed in an internal network, deployment may be performed according to the first deployment flavour, and the firewall module VDU3 is not required. When the router VNF is deployed at a network edge, deployment needs to be performed according to the second deployment flavour. FIG. 2(a) and FIG. 2(b) show deployment example diagrams of the first deployment flavour and the second deployment flavour.

However, according to the prior-art VNFD described by using the TOSCA model, it may be found that a plurality of TOSCA service templates need to be used if a plurality of deployment flavours need to be described, resulting in a waste of resources.

SUMMARY

The present invention provides a method and an apparatus for deploying a service in a virtualized network, to resolve a prior-art problem that one service template cannot support a plurality of deployment flavours.

According to a first aspect, an embodiment of the present invention provides a method for deploying a service in a virtualized network, including: receiving, by a virtualized network function manager, an instantiation request, where the instantiation request includes a VNF instance identifier and a first deployment flavour identifier; and obtaining a VNF deployment template VNFD corresponding to the VNF instance identifier. Compared with the prior art, in this embodiment of the present invention, content included in the VNFD is extended. Specifically, the VNFD includes description information of at least two potential deployment nodes and description information of at least two deployment flavours, description information of each potential deployment node includes node information and a deployment condition of the potential deployment node, and description information of each deployment flavour includes deployment information of a to-be-deployed node corresponding to the deployment flavour. The virtualized network function manager determines, based on the first deployment flavour identifier in the instantiation request and the VNFD, node information and deployment information of a to-be-deployed node corresponding to the first deployment flavour identifier, and sends the determined node information and deployment information of the to-be-deployed node to a virtualized infrastructure manager for the virtualized infrastructure manager to perform an instantiation operation.

In this embodiment of the present invention, description information of deployment flavours are added to the VNFD. Specifically, to-be-deployed nodes and deployment information for different deployment flavours are defined, and a deployment flavour identifier is added to an instantiation request. When receiving an instantiation request, the VNFM determines a to-be-deployed node and deployment information based on a deployment flavour identifier in the instantiation request, and sends the to-be-deployed node and the deployment information to the VIM for the VIM to perform an instantiation operation. In this way, a service requirement that a same VNFD supports a plurality of deployment flavours can be implemented, providing a more flexible service deployment method.

In a possible design, the deployment condition includes a deployment identifier, and that the virtualized network function manager determines, based on the first deployment flavour identifier and the VNFD, node information and deployment information of a to-be-deployed node corresponding to the first deployment flavour identifier is specifically: for the description information of each potential node, comparing the first deployment flavour identifier with the deployment identifier included in the deployment condition of the potential deployment node; when the first deployment flavour identifier matches the deployment identifier included in the deployment condition of the potential deployment node, determining the potential deployment node as the to-be-deployed node; obtaining the node information of the to-be-deployed node; obtaining deployment flavour description information, in the VNFD, corresponding to the first deployment flavour identifier; and determining the deployment information of the to-be-deployed node based on the deployment flavour description information corresponding to the first deployment flavour identifier. That the first deployment flavour identifier matches the deployment identifier included in the deployment condition of the potential deployment node is specifically that the deployment identifier included in the deployment condition of the potential deployment node is the same as the first deployment flavour identifier, or that the deployment identifier included in the deployment condition of the potential deployment node includes the first deployment flavour identifier, or that the deployment identifier included in the deployment condition of the potential deployment node is null (any deployment flavour meets the deployment condition of the potential deployment node). Compared with the prior art, in this embodiment of the present invention, the deployment condition of the node is added, and it is determined, through a comparison between the deployment condition and the deployment flavour identifier in the instantiation request, whether a node needs to be deployed. In this way, a requirement of flexible deployment of a service depending on the VNFD is implemented.

In another possible design, a network functions virtualization orchestrator receives a registration request sent by an initiator, where the registration request includes a VNF deployment package. The VNF deployment package includes a VNFD. Optionally, the VNF deployment package further includes an image file and/or a security certificate, or the like. The network functions virtualization orchestrator stores the deployment package in the registration request, and returns a registration success response message to the initiator; the network functions virtualization orchestrator receives a VNF instance identifier creating request sent by the initiator, and forwards the VNF instance identifier creating request to a virtualized network function manager; the virtualized network function manager generates a VNF instance identifier, and sends the VNF instance identifier to the network functions virtualization orchestrator; and the network functions virtualization orchestrator locally establishes a correspondence between the VNF instance identifier and deployment package information, and returns the VNF instance identifier to the initiator.

In another possible design, after VNF instantiation, the virtualized network function manager may update a current VNF deployment flavour depending on a running requirement. Specifically, the virtualized network function manager receives a deployment flavor update request, where the deployment flavor update request includes the VNF instance identifier and a second deployment flavour identifier; obtains the VNFD based on the VNF instance identifier; determining node information and deployment information of a to-be-deployment-updated node based on a first deployment flavour identifier, the second deployment flavour identifier, and the VNFD; and sending the determined node information and deployment information of the to-be-deployment-updated node to the virtualized infrastructure manager for the virtualized infrastructure manager to perform an instantiation operation. In this embodiment of the present invention, one deployment template is used to implement different service deployments, improving flexibility of virtualized service deployment and saving deployment template resources. Compared with the prior art in which a plurality of deployment templates are required to implement different service deployments, the method in this embodiment of the present invention can further be used to reduce an interruption time of an current service during deployment switching.

According to a second aspect, an embodiment of the present invention provides an apparatus for deploying a service in a virtualized network. The apparatus for deploying a service in a virtualized network has a function of implementing the actions of the virtualized network function manager in the first aspect. The function may be implemented by using hardware, or may be implemented by executing corresponding software by hardware. The hardware or software includes one or more modules corresponding to the foregoing function.

In a possible design, a structure of the apparatus for deploying a service in a virtualized network includes a processor and a memory. The memory is configured to store a program that supports the apparatus for deploying a service in a virtualized network in executing the foregoing method, and the processor is configured to execute the program stored in the memory. The apparatus for deploying a service in a virtualized network may further include a communications interface, configured for the apparatus for deploying a service in a virtualized network to communicate with another device or communications network.

According to a third aspect, an embodiment of the present invention provides a computer storage medium, configured to store computer software instructions used by the foregoing apparatus for deploying a service in a virtualized network, where the computer software instructions include a program designed for the apparatus for deploying a service in a virtualized network for implementing the foregoing aspect.

Optionally, in the foregoing aspects, the node includes a virtualization deployment unit VDU or a virtual link VL, and the deployment information includes scaling parameters of the VDU or quality of service parameters of the VL.

Compared with the prior art, the solutions provided in the present invention can implement a service requirement that a same VNFD supports a plurality of deployment flavours, providing a more flexible service deployment method. In addition, because different deployment methods are based on a same deployment template, the initiator does not need to repeat registration on an NFVO, and the VNFM does not need to obtain a plurality of deployment templates from the NFVO, either. This lowers service deployment complexity.

These or other aspects of the present invention are clearer and easier to understand in the following descriptions of embodiments.

BRIEF DESCRIPTION OF DRAWINGS

Some features of the present invention are now described with reference to the accompanying drawings and by using non-restrictive embodiments, where

FIG. 2(*b*) is an example diagram of a deployment according to a second deployment method;

DESCRIPTION OF EMBODIMENTS

To make the objectives, technical solutions, and advantages of the embodiments of the present invention clearer, the following clearly describes the technical solutions of the embodiments of the present invention with reference to the accompanying drawings in the embodiments of the present invention.

Figure 3:
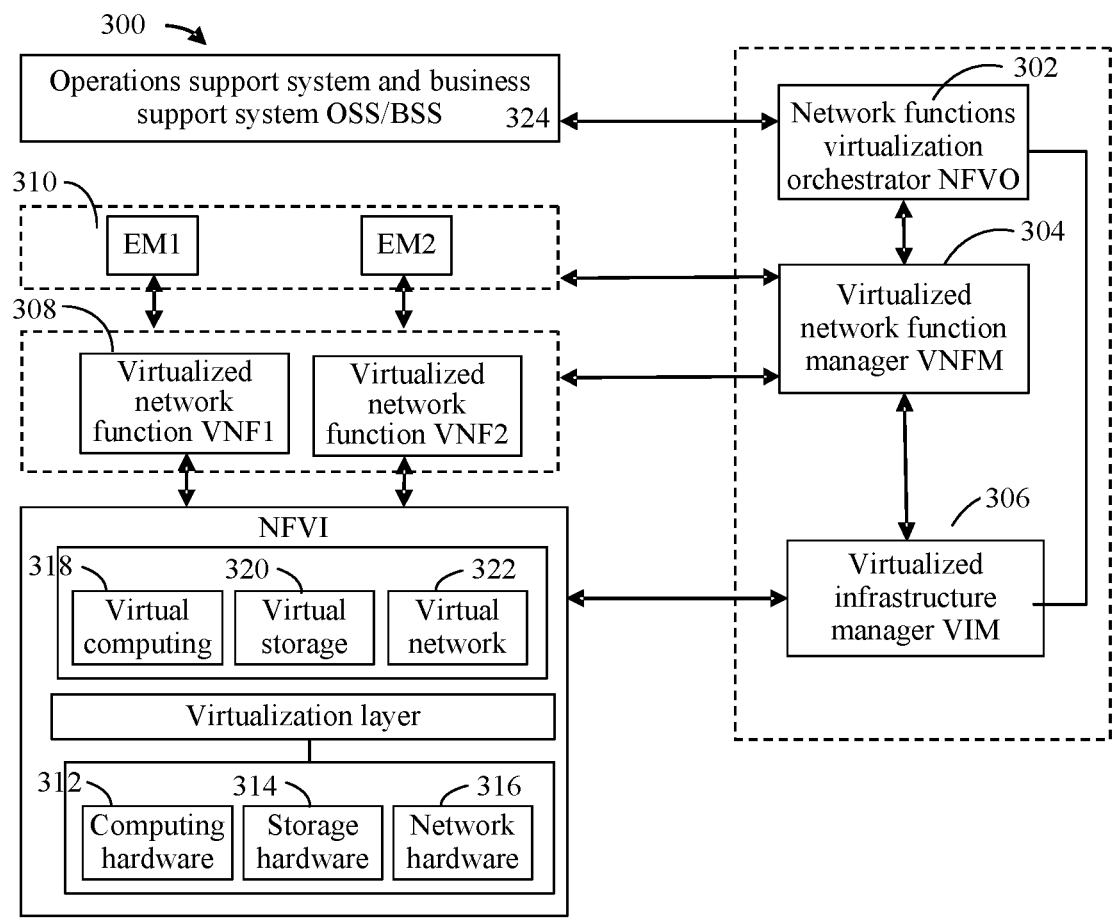
FIG. 3 is a diagram of a network architecture of network functions virtualization according to an embodiment of the present invention.

FIG. 3 is a schematic architectural diagram of an NFV system 300 provided in an embodiment of the present invention, for service deployment in a virtualized network. Specifically, to achieve the objectives of the present invention, the schematic architectural diagram provided in this embodiment of the present invention includes the following functional components: a network functions virtualization orchestrator 302, a virtualized network function manager 304, a virtualized infrastructure manager 306, a network functions virtualization infrastructure, a virtualized network function 308, an equipment management system 310, and an operations support system and business support system 324.

The network functions virtualization orchestrator (network functions virtualization orchestrator, NFVO) 302 is mainly responsible for lifecycle management of a virtualized service, allocation and scheduling of a virtual resource in the network functions virtualization infrastructure NFVI, and the like. The NFVO 302 may communicate with one or more virtualized network function managers (Virtualized Network Function Manager, VNFM) 304, to execute a resource-related request, send configuration information to the VNFM 304, and collect status information of the VNF 308. In addition, the NFVO 302 may communicate with the virtualized infrastructure manager (Virtualized Infrastructure Manager, VIM) 306, to perform resource allocation and/or reservation, and exchange configuration and status information of a virtualized hardware resource.

The virtualized network function manager (VNFM) 304 is responsible for lifecycle management of one or more VNFs, for example, instantiating (instantiating), updating (updating), querying, scaling (scaling), and terminating (terminating) the VNF 308. The VNFM 304 may communicate with the VNF 308 to complete VNF lifecycle management and exchange of configuration and status information. There may be a plurality of VNFMs in the NFV architecture that are responsible for managing different types of VNFs. Depending on service types in the charge of these VNFMs, the NFVO 302 may determine different VNFMs 304 for different VNFs 308.

The virtualized infrastructure manager (VIM) 306 controls and manages interactions between the VNF 308, and computing hardware 312, storage hardware 314, network hardware 316, virtual computing (virtual computing) 318, virtual storage 320, and a virtual network 322. For example, the VIM 306 implements a resource management function, including managing infrastructure resource allocation (for example, adding or reducing a resource for a virtual container) and running a function (for example, collecting NFVI fault information). The VNFM 304 and the VIM 306 may communicate with each other to request resource allocation.

The network functions virtualization infrastructure (network functions virtualization infrastructure, NFVI) is an infrastructure layer of NFV, including a hardware component, a software component, or a combination of both, to establish a virtualization environment, and deploy, manage, and implement the VNF 308. Hardware resources and a virtualization layer are used to provide the VNF 308 with virtualized resources, for example, virtual machines VMs and/or virtual containers of another form. The hardware resources include the computing (computing) hardware 312, the storage hardware 314, and the network hardware 316. In an implementation, resources of the computing hardware 312 and the storage hardware 314 may be pooled (pooled). The virtualization layer in the NFVI may abstract the hardware resources to decouple the VNF 308 from an underlying physical network layer. The virtualized resources include the virtual computing 318 (for example, virtual machines, VMs), the virtual storage 320, and the virtual network 322. The virtual computing 318 and the virtual storage 320 are provided in a form of virtual machines and/or other virtual containers for the VNF 308 by using a system management program (hypervisor or container runtime). For example, one or more VNFs 308 may be deployed on one VM.

A plurality of virtualized network functions (VNF) 308 are configured as virtualization of at least one network function. The VNF 308 may be a virtualized provider edge (provider edge, PE) node, configured to provide all PE network functions of a non-virtualized PE device, for example, a router (router), a switch (switch), a bridge (bridge), a server, or a cloud computing system. Each VNF runs on one or more virtual containers, corresponding to a group of network functions that belong to one or more physical devices.

The equipment management system (EM) 310 is a system, in a traditional telecommunications system, configured to perform device configuration and management. In the NFV architecture, the EM 310 may also be configured to perform VNF configuration and management, and initiate a lifecycle management operation, such as instantiation of a new VNF, to the VNFM 304.

The operations support system and business support system (Operations Support System and Business Support System, OSS/BSS) 324 supports various end-to-end telecommunications services. Management functions supported by the OSS include network configuration, service provision, fault management, and the like. The BSS processes orders, payments, income, and the like, and supports product management, order management, yield management, and customer management. The OSS/BSS 324 may act as an initiator of a virtualized service, and is mainly configured to request, by using an interface opened by the NFV system, deployment of the virtualized service and manage a lifecycle of the virtualized service.

In this embodiment of the present invention, after receiving an instantiation request, the VNFM obtains a VNF deployment template VNFD from the NFVO based on a VNF instance identifier in the instantiation request. The VNFD includes description information of at least two potential deployment nodes and description information of at least two deployment flavours, description information of each potential deployment node in the description information of the at least two potential deployment nodes includes an identifier, node information, and a deployment condition of the potential deployment node, and description information of each deployment flavour in the description information of the at least two deployment flavours includes a node identifier and deployment information of a to-be-deployed node corresponding to the deployment flavour. The VNFM determines, based on a deployment flavour identifier and the VNFD, node information and deployment information of a to-be-deployed node corresponding to the deployment flavour identifier in the instantiation request, and sends the determined node information and deployment information of the to-be-deployed node to the virtualized infrastructure manager VIM for the VIM to perform an instantiation operation. In this way, an objective to perform different deployments based on one deployment template is achieved.

Figure 1:
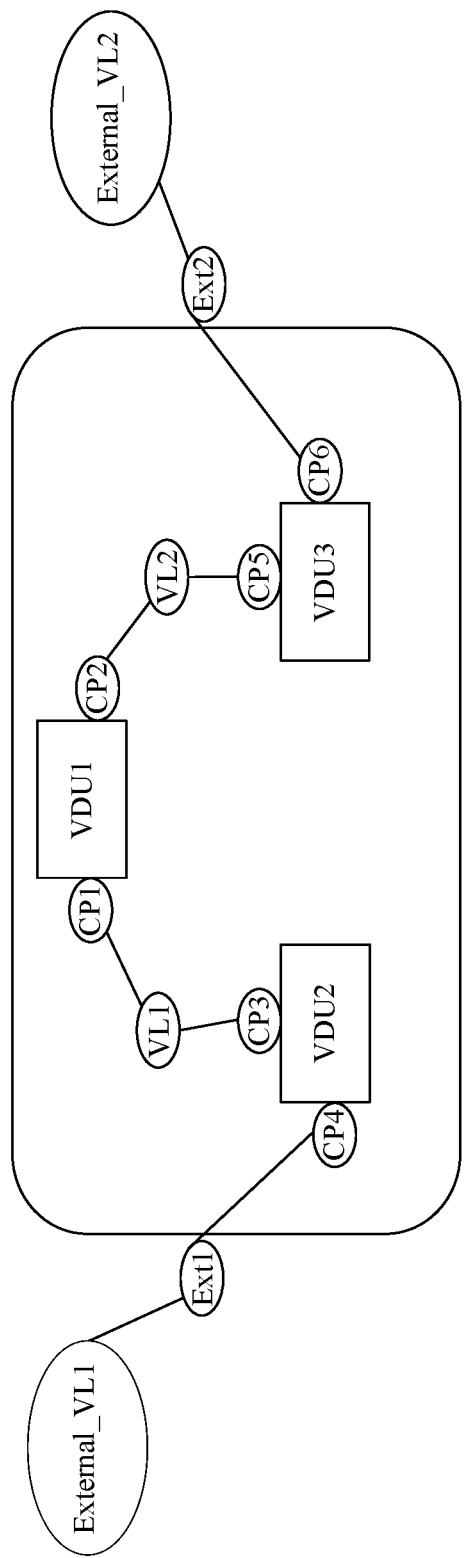
FIG. 1 is an example diagram of a VNF deployment template obtained based on a VNFD shown in code (1)
Figure 2A:
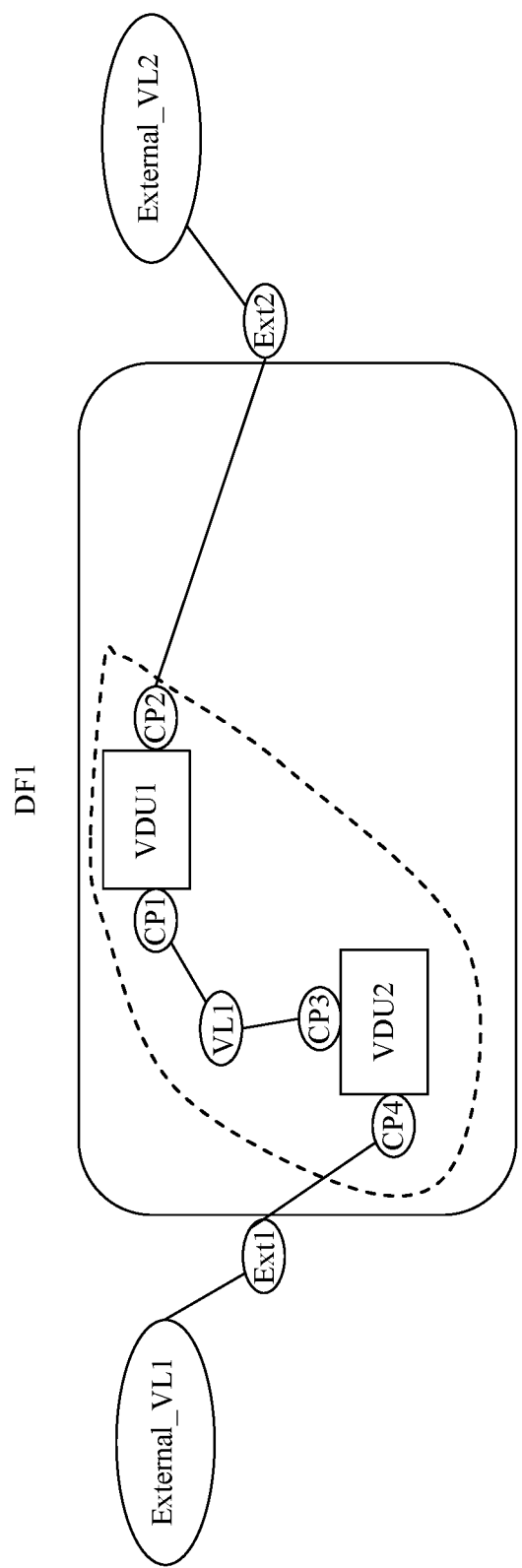
FIG. 2(*a*) is an example diagram of a deployment according to a first deployment method.
Figure 2B:
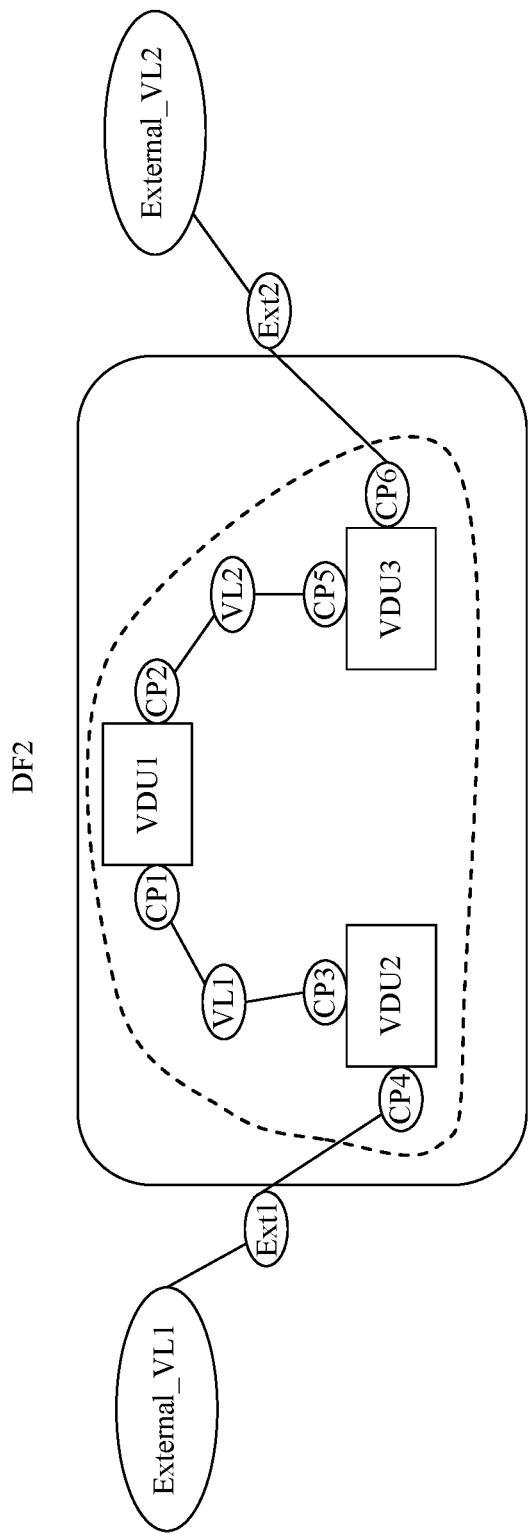

For ease of describing solutions in the embodiments of the present invention, code (2) describes a deployment template of a VNF. This deployment template may be used to implement deployment solutions of example diagrams shown in FIG. 2(*a*) and FIG. 2(*b*). It should be noted that the code (2) lists only content related to the embodiments of the present invention, and other content is covered by the prior art and is not limited in the embodiments of the present invention.

Code (2):

```
tosca_definitions_version:    tosca_simple_profile_for_nfv_1_0
topology_template:            # In inputs, select an identifier of a deployment
  inputs:                     flavour for a specific deployment. In this example,
    deployment_flavour:       DF1 or DF2 may be selected.
  DSL_definitions:            # In DSL_definitions, define description information
    DF1: &DF1                 of two deployment flavours, DF1 and DF2.
      VDU1                    # In DF1, specify a to-be-deployed node and
        Scalable:             corresponding deployment information
          min_instances: 3
          max_instances: 10
```

-continued

Code (2):

```
    VDU2
        Scalable:
            min_instances: 3
            max_instances: 10
    VL1
        QoS:
            Latency:10
            Jitter:20
    External_CP_1:CP4
    External_CP_2:CP2
DF2: &DF2
    VDU1
        Scalable:
            min_instances: 10
            max_instances: 20
    VDU2
        Scalable:
            min_instances: 10
            max_instances: 20
    VDU3
        Scalable:
            min_instances: 10
            max_instances: 20
    VL1
        QoS:
            Latency:5
            Jitter:10
    VL2
        QoS:
            Latency:10
            Jitter: 20
    External_CP_1: CP4
    External_CP_2: CP6
substitution_mappings:        # Describe which CPs act as external connection points to
                              connect to external networks.
    node_type: tosca.nodes.nfv.VNF.VNF
    requirements:
        virtualLink:    [get_DSL:[(get_input:deployment_flavour),External_CP_1],
virtualLink]
            target:External_VL1
        virtualLink:    [get_DSL:[(get_input:deployment_flavour),External_CP_2],
virtualLink]
            target:External_VL2
node_templates:
    VDU1:
        type: tosca.nodes.nfv.VDU
        deploy_dependsOnDF: [DF1,DF2]
        requirements:
            - host:
                properties:
                    num_cpus: { equal: 2 }
                    mem_size: { greater_or_equal: 2 GB}
            Capabilities:             # Information about a scalable quantity of
                                      instances
            scalable:    [get_DSL:(get_input:deployment_flavour),VDU1,scalable]
    VDU2:
        type: tosca.nodes.nfv.VDU
        deploy_dependsOnDF: [DF1,DF2]
        requirements:
            - host:
                properties:
                    num_cpus: { equal: 4 }
                    mem_size: { greater_or_equal: 3 GB}
        Capabilities:
            scalable: [get_DSL:[get_DSL:(get_input:deployment_flavour),VDU2,scalable]
    VDU3:
        type: tosca.nodes.nfv.VDU
        deploy_dependsOnDF: [DF2]
        requirements:
            - host:
                properties:
                    num_cpus: { equal: 2 }
                    mem_size: { greater_or_equal: 3 GB}
        Capabilities:
            scalable:
[get_DSL:(get_input:deployment_flavour),VDU3,scalable]
    VL1
```

Code (2):

```
        type: tosca.nodes.nfv.VL.ELAN
        deploy_dependsOnDF: [DF1,DF2]
        properties:
            QoS: [get_DSL:[get_DSL:(get_input:deployment_flavour),VL1,QoS]]
    VL2
        type: tosca.nodes.nfv.VL.ELAN
        deploy_dependsOnDF: [DF2]
        properties:
            QoS: [get_DSL:[get_DSL:(get_input:deployment_flavour),VL2,QoS]]
    CP1:
        type: tosca.nodes.nfv.CP
        requirements:
            virtualbinding: VDU1
            virtualLink: VL1
    CP2:
        type: tosca.nodes.nfv.CP
        requirements:
            virtualbinding: VDU1
            virtualLink: VL2
    CP3
        type: tosca.nodes.nfv.CP
        requirements:
            virtualbinding: VDU2
            virtualLink: VL1
    CP4
        type: tosca.nodes.nfv.CP
        requirements:
            virtualbinding: VDU2
    CP5
        type: tosca.nodes.nfv.CP
        requirements:
            virtualbinding: VDU3
            virtualLink: VL2
    CP6
        type: tosca.nodes.nfv.CP
        requirements:
            virtualbinding: VDU3
```

The embodiments of the present invention may be implemented by using a TOSCA model. For example, the code (2) has some extensions compared with the prior-art code (1). Specifically, a definition of a deployment flavour DF is added to the DSL_definitions part. A definition of each DF includes information about a VDU, a VL and an external connection point that need to be deployed. The external connection point information is used to indicate which connection points are used by the VNF to connect to external networks. For example, the DF1 in a VNFD in the code (2) includes the VDU1, the VDU2, and the VL1, and the code External_CP_1:CP4 and the code External_CP_2: CP2 indicate that the CP2 and the CP4 act as external connection points in the DF1. The DF2 includes the VDU1, the VDU2, the VDU3, the VL1, and the VL2, and the code External_CP_1: CP4 and the code External_CP_2: CP6 indicate that the CP4 and the CP6 act as external connection points in the DF2. A VDU and a VL that need to be deployed in a DF further include deployment information. For example, the VDU1 in the DF1 has scalable parameters, among which the code min_instances: 3 and the code max instances: 10 define that a minimum quantity of instances is 3 and that a maximum quantity of instances is 10; the VL1 in the DF1 includes quality of service (Quality of Service, QoS) parameters for deployment, where a latency is 10 ms, and a jitter is 20 ms. It should be noted that deployment information of a to-be-deployed node in a DF may alternatively be any information that needs to be used when the node is being deployed. Herein, the scalable parameters and the QoS parameters are merely example presentation, and specific content of the deployment information in the embodiments of the present invention is not limited.

Further, in the embodiments of the present invention, a description about selecting an external connection point based on a deployment flavour is added to the substitution_mappings part (substitution_mappings) in the VNFD. Specifically, the get_DSL: [(get_input:deployment_flavour),External_CP_1] operation is used to flexibly select a corresponding external connection point based on the value of the deployment_flavour. get_DSL is used to obtain a value of a parameter from DSL_definitions, and the get_input:deployment_flavour parameter is used to obtain an input value of deployment_flavour. In the embodiments of the present invention, the input value of deployment_flavour is determined by the deployment flavour identifier in the VNF instantiation request. For example, the deployment flavour identifier may be DF1 or DF2. The External_CP_1 parameter in get_DSL is used to indicate a value of a specific parameter that needs to be obtained. In the example of the code (2), "External_CP_1" indicates that a value of External_CP_1 is to be obtained. According to the description of the DF in the foregoing code (2), for example, when the input value of deployment flavour is DF1 or DF2, the value obtained by the get_DSL: [(get_input:deployment flavour), External_CP_1] operation is CP4.

In addition, the node templates (node templates) part in the VNFD includes description information of nodes such as a VDU, a VL, and a CP in the VNF, including identifiers of the nodes, node information, and deployment conditions of the nodes. Compared with the prior art, the deploy_dependsOnDF parameter is added to each node description. This parameter is used to indicate a deployment condition of a node. Optionally, the deployment condition may be a deployment flavour identifier. For example, in the node description of the VDU1, the code deploy_dependsOnDF: [DF1,DF2] indicates that the VDU1 needs to be deployed when the value of deployment flavour is DF1 or DF2. For the VDU3, the code deploy_dependsOnDF: [DF2] indicates that the VDU3 needs to be deployed when the value of deployment_flavour is DF2, and that the VDU3 does not need to be deployed when the value of deployment_flavour is DF1. In description information of a node, the get_DSL operation is also used for value assignments for some parameters. This operation is used to obtain corresponding deployment information from description information of a specified deployment flavour. For example, when the input deployment_flavour is DF1, scalable: [get_DSL:(get_input: deployment_flavour),VDUL,scalable] in the VDU1 indicates obtaining values of the scalable parameters, min_instances: 3 and max instances: 10, in the VDU1 from the DF1 in DSL_definitions, and QoS: [get_DSL:(get_input:deployment_flavour),VL1,QoS]] indicates obtaining values of the QoS parameters of the VL1 from the DF1 defined in DSL_definitions. In addition, description information of a node further includes node information of the node. For example, num_cpus: {equal: 2} and mem_size: {greater_or_equal: 3 GB} in the VDU1 are used to indicate a performance requirement (two CPUs, each having 3 GB memory) of the VDU1 on a virtual machine during deployment of the VDU1. It should be noted that, node information and deployment information of a node jointly form information that needs to be used during deployment of the node, but the node information is used to indicate information that needs to be used when the node is deployed, and this information that needs to be used does not change as the deployment flavour changes. For example, in the embodiments of the present invention, during deployment based on either the DF1 or the DF2, the VDU1 needs to be deployed, and for deployment of the VDU1, the VDU1 has the same performance requirement (two CPUs, each having 3 GB memory) on the virtual machine. Therefore, the performance requirement of the VDU1 on the virtual machine for deployment of the VDU1 may be stored in a node template as the node information of the VDU1.

Figure 4:
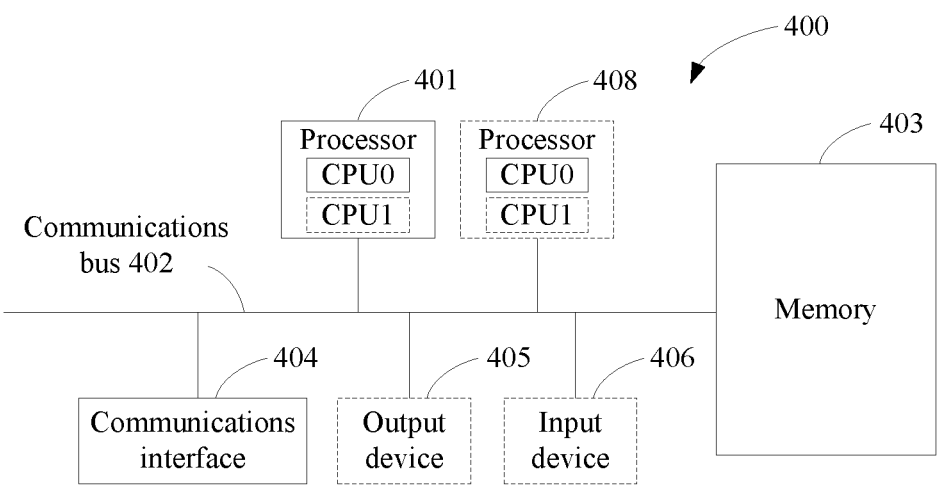
FIG. 4 is a schematic diagram of a computer device according to an embodiment of the present invention.

As shown in FIG. 4, the virtualized network function manager VNFM in FIG. 3 may be implemented in a form of a computer device (or system) in FIG. 4.

FIG. 4 is a schematic diagram of a computer device according to an embodiment of the present invention. The computer device 400 includes at least one processor 401, a communications bus 402, a memory 403, and at least one communications interface 404.

The processor 401 may be a general-purpose central processing unit (CPU), a microprocessor, an application-specific integrated circuit (application-specific integrated circuit, ASIC), or one or more integrated circuits for controlling execution of a solution program of the present invention.

The communications bus 402 may include a path to transfer information between the foregoing components. The communications interface 504 uses any transceiver like apparatus to communicate with another device or communications network, such as an Ethernet network, a radio access network (RAN), or a wireless local area network (Wireless Local Area Networks, WLAN).

The memory 403 may be a read-only memory (read-only memory, ROM) or another type of static storage device that is capable of storing static information and instructions, a random access memory (random access memory, RAM) or another type of dynamic storage device that is capable of storing information and instructions, an electrically erasable programmable read-only memory (Electrically Erasable Programmable Read-Only Memory, EEPROM), a compact disc read-only memory (Compact Disc Read-Only Memory, CD-ROM) or other optical disc storage, optical disc storage (including a compact disc, a laser disc, an optical disc, a digital versatile disc, a Blu-ray disc, or the like), a magnetic disc storage medium or another magnetic storage device, or any other computer-accessible medium that can be used to carry or store expected program code in an instruction or data structure form, without being limited thereto though. The memory may exist independently, and is connected to the processor by using the bus. The memory may alternatively be integrated with the processor.

The memory 403 is configured to store program code for executing the solutions of the present invention, and the processor 401 controls execution. The processor 401 is configured to execute the program code stored in the memory 403.

During specific implementation, in an embodiment, the processor 401 may include one or more CPUs, for example, a CPU0 and a CPU1 in FIG. 4.

During specific implementation, in an embodiment, the computer device 400 may include a plurality of processors, for example, the processor 401 and a processor 408 in FIG. 4. Each of the processors may be a single-core processor, or may be a multi-core processor. The processor herein may indicate one or more devices, circuits, and/or processing cores for processing data (for example, computer program instructions).

During specific implementation, in an embodiment, the computer device 400 may further include an output device 405 and an input device 406. The output device 405 communicates with the processor 401, and may display information in a plurality of manners. For example, the output device 405 may be a liquid crystal display (liquid crystal display, LCD), a light emitting diode (light emitting diode, LED) display device, a cathode ray tube (cathode ray tube, CRT) display device, a projector (projector), or the like. The input device 406 communicates with the processor 401, and may receive a user input in a plurality of manners. For example, the input device 406 may be a mouse, a keyboard, a touchscreen device, a sensor device, or the like.

The foregoing computer device 400 may be a general-purpose computer device or a dedicated computer device. During specific implementation, the computer device 400 may be a desktop computer, a portable computer, a network server, a personal digital assistant (Personal Digital Assistant, PDA), a mobile phone, a tablet computer, a wireless terminal device, a communications device, a built-in device, or a device with a structure similar to the structure in FIG. 4. This embodiment of the present invention does not limit a type of the computer device 400.

The virtualized network function manager shown in FIG. 3 may be the device shown in FIG. 4. The memory in the virtualized network function manager stores one or more software modules. The virtualized network function manager may implement the software module by using the processor and the program code stored in the memory, to achieve an objective to perform different deployments based on one VNFD.

Figure 5A:
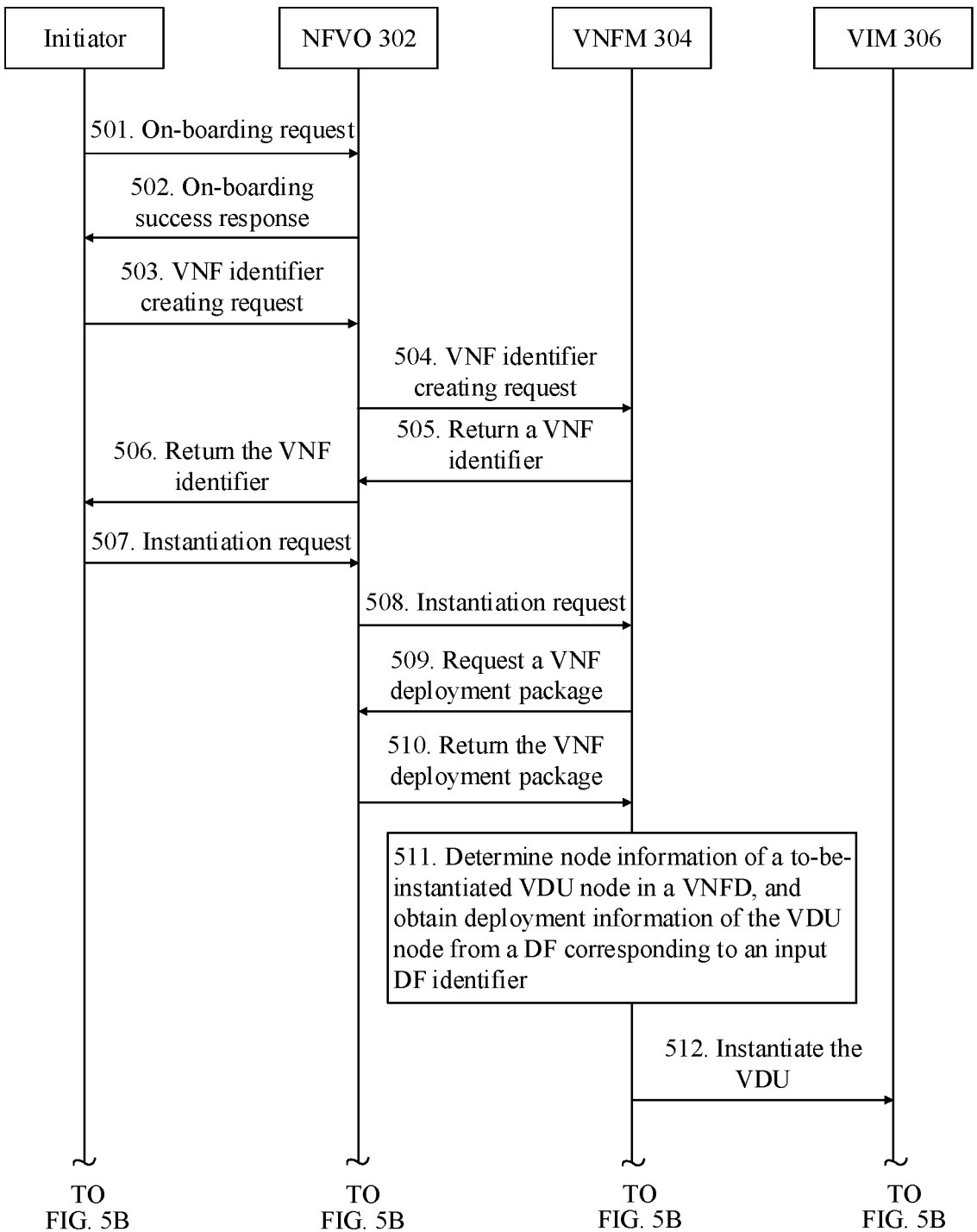
FIG. 5A and FIG. 5B are a flowchart of a method for deploying a service in a virtualized network according to an embodiment of the present invention.
Figure 5B:
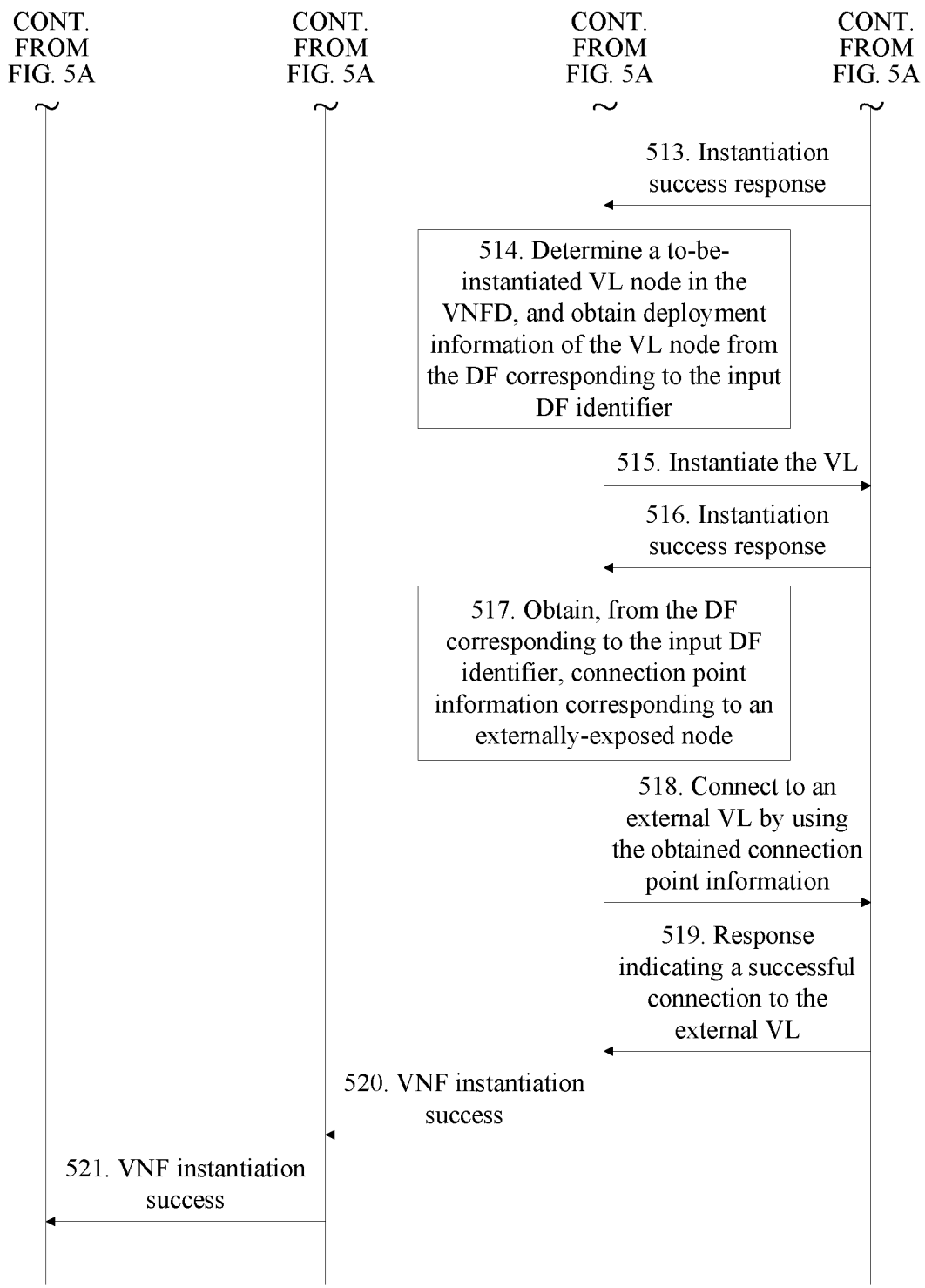

FIG. 5A and FIG. 5B are a flowchart of a method for deploying a service in a virtualized network according to an embodiment of the present invention. The method includes the following steps.

Step 501. An initiator sends, to an NFVO, a registration request for registering a VNF deployment package.

Specifically, the VNF deployment package includes a VNFD. Optionally, the VNF deployment package further includes an image file and/or a security certificate, or the like. Files other than the VNFD that are not related to the present invention are not described in detail herein.

With reference to the schematic architectural diagram of the NFV system shown in FIG. 3, the initiator may be the OSS/BSS 324. The OSS/BSS 324 sends the registration request to the NFVO by using an interface opened by the NFV system. The registration request may be specifically an on-boarding request, and the registration request includes the VNF deployment package.

For example, the VNFD in this embodiment of the present invention includes description information of at least two potential deployment nodes and description information of at least two deployment flavours. Description information of each potential deployment node in the description information of the at least two potential deployment nodes includes an identifier, node information, and a deployment condition of the potential deployment node, and description information of each deployment flavour in the description information of the at least two deployment flavours includes a node identifier and deployment information of a to-be-deployed node corresponding to the deployment flavour.

The potential deployment node may be a virtualization deployment unit VDU or a virtual link VL, for example, the VDU1, the VDU2, the VDU3, the VL1, or the VL2 in the code (2).

The deployment information includes scaling parameters of the VDU or QoS parameters of the VL.

Step 502. The NFVO receives the registration request sent by the initiator, stores the deployment package in the registration request, and returns a registration success response message.

The registration success response message includes deployment package information.

The deployment package information may be an identifier of the deployment package, or may be a group of parameters that can uniquely determine the deployment package. In short, there is a one-to-one correspondence between deployment package information and corresponding deployment packages. A specific form of the deployment package information is not limited in the present invention.

Step 503. The initiator receives the registration success response message returned by the NFVO, and sends a VNF instance identifier creating request to the NFVO.

Specifically, the VNF instance identifier creating request includes the deployment package information.

Step 504. The NFVO receives the VNF instance identifier creating request sent by the initiator, and forwards the VNF instance identifier creating request to a VNFM.

Step 505. The VNFM receives the VNF instance identifier creating request sent by the NFVO, generates a VNF instance identifier, and sends the generated VNF instance identifier to the NFVO.

It should be noted that how a VNF instance identifier is specifically generated is not limited in the present invention. In a possible design, the VNFM generates a character string that is locally unique, and generates the VNF instance identifier based on an address of the VNFM in the NFV system and the character string. Alternatively, the VNFM generates a character string that is globally unique in the NFV system, and generates the VNF instance identifier based on the globally unique character string.

Step 506. The NFVO receives the VNF instance identifier returned by the VNFM, locally establishes a correspondence between the VNF instance identifier and deployment package information, and returns the VNF instance identifier to the initiator.

Step 507. The initiator receives the VNF instance identifier returned by the NFVO, and sends a VNF instantiation request to the NFVO.

Specifically, the VNF instantiation request includes the VNF instance identifier and a first deployment flavour identifier DF1.

Step 508. The NFVO receives the VNF instantiation request sent by the initiator, and forwards the VNF instantiation request to the VNFM.

Step 509. The VNFM receives the VNF instantiation request sent by the NFVO, and sends a deployment package obtaining request to the NFVO.

Specifically, the VNF deployment package obtaining request includes the VNF instance identifier.

Step 510. The NFVO receives the deployment package obtaining request sent by the VNFM, obtains the deployment package corresponding to the VNF instance identifier, and returns the obtained deployment package to the VNFM.

The NFVO obtains the deployment package corresponding to the VNF instance identifier is specifically that the NFVO obtains the deployment package information corresponding to the VNF instance identifier from the locally stored correspondence between the VNF instance identifier and the deployment package information, and obtains the deployment package based on the deployment package information corresponding to the VNF instance identifier.

Step 511. The VNFM receives the deployment package returned by the NFVO, determines node information of a to-be-instantiated VDU node in a VNFD in the deployment package, and obtains deployment information of the VDU node based on deployment flavour description information corresponding to a first deployment flavour identifier.

The node information of the VDU node is deployment parameters, in the VNFD, that are the same when the VDU node is deployed based on different deployment flavours, for example, CPU and memory information described in the requirements part of the VDU1 node in the code (2).

Optionally, the node information of the VDU node may alternatively be described in the deployment flavour description information. In this case, the node information may be a part of the deployment information. When the node information of the VDU node is a part of the deployment information, a VDU instantiation request may include only the deployment information of the VDU node.

Specifically, for description information of each VDU node in the VNFD, the first deployment flavour identifier DF1 and a deployment identifier included in a deployment condition of the VDU node are compared; when the first deployment flavour identifier matches the deployment identifier included in the deployment condition of the VDU node, the VDU node is determined as a to-be-deployed node; node information of the VDU node is obtained; the deployment flavour description information, in the VNFD, corresponding to the first deployment flavour identifier is obtained; and deployment information of the VDU node is determined based on the deployment flavour description information corresponding to the first deployment flavour identifier.

That the first deployment flavour identifier matches the deployment identifier included in the deployment condition of the VDU node is specifically that the deployment identifier included in the deployment condition of the VDU node is the same as the first deployment flavour identifier, or that the deployment identifier included in the deployment condition of the VDU node includes the first deployment flavour identifier, or that the deployment identifier included in the deployment condition of the VDU node is null (any deployment flavour meets the deployment condition of the VDU node).

For example, in this embodiment of the present invention, with reference to the description information of the VDU1 node in the code (2), the deploy_dependsOnDF parameter of the VDU1 includes the deployment flavour identifier DF1 in the instantiation request. Therefore, the VDU1 needs to be deployed during VNF instantiation. The VNFM obtains node information of the VDU, for example, a performance requirement (two CPUs, each having 3 GB memory) of the VDU1 on a virtual machine during deployment of the VDU1, and then obtains scalable parameters of the VDU1 from the DF1 in DSL_definitions of the VNFD based on scalable: [get_DSL:(get_input:deployment_flavour),VDU1, scalable] in the VDU1.

Step 512. The VNFM sends a VDU instantiation request to a VIM, where the VDU instantiation request includes the node information and the deployment information of the VDU node.

Step 513. The VIM receives the VDU instantiation request sent by the VNFM, creates a virtual machine based on the deployment information in the VDU instantiation request, and returns an instantiation success response to the VNFM.

That a VIM instantiates a VDU depending on node information and deployment information is a technology commonly known to persons skilled in the art and is not described in detail in this embodiment of the present invention.

Step 514. The VNFM determines a to-be-instantiated VL node in the VNFD of the deployment package, and obtains node information and deployment information of the VL node based on the deployment flavour description information corresponding to the first deployment flavour identifier.

The deployment information of the VL node includes quality of service parameters of the VL, and the node information of the VL node includes connection point information corresponding to the VL node. The connection point information corresponding to the VL node is used to indicate which connection point is used by the VL node to connect to another node.

Specifically, for each VL node in the VNFD, the first deployment flavour identifier and a deployment identifier included in a deployment condition of the VL node are compared; when the first deployment flavour identifier matches the deployment identifier included in the deployment condition of the VL node, the VL node is determined as a to-be-deployed node; node information of the VL node is obtained; the deployment flavour description information, in the VNF deployment package, corresponding to the first deployment flavour identifier is obtained; and deployment information of the VL node is determined based on the deployment flavour description information corresponding to the first deployment flavour identifier.

That the first deployment flavour identifier matches the deployment identifier included in the deployment condition of the VL node is specifically that the deployment identifier included in the deployment condition of the VL node is the same as the first deployment flavour identifier, or that the deployment identifier included in the deployment condition of the VL node includes the first deployment flavour identifier, or that the deployment identifier included in the deployment condition of the VL node is null (any deployment flavour meets the deployment condition of the VL node).

For example, in this embodiment of the present invention, with reference to the description information of the VL1 node in the code (2), the deploy_dependsOnDF parameter of the VL1 includes the deployment flavour identifier DF1 in the instantiation request. Therefore, the VL1 needs to be deployed during VNF instantiation. The VNFM obtains node information of the VL1, for example, connection point information for deploying the VL1 (connecting the VDU1 node and the VDU2 node by using the CP1 on the VDU1 and the CP3 on the VDU2), and then obtains QoS parameters of the VL1 from the DF1 in DSL_definitions of the VNFD based on QoS: [get_DSL:(get_input:deployment_flavour),VL1,QoS]] in the VL1.

Specifically, when the VL to-be-deployed node is determined, the connection point information corresponding to VL to-be-deployed node needs to be obtained. For example, after determining that the VL1 needs to be deployed, the VNFM may learn that the VL1 node establishes a connection to the VDU1 by using the connection point CP1 and establishes a connection to the VDU2 by using the connection point CP3, from the code in node templates in the VNFD:

```
CP1:
    type: tosca.nodes.nfv.CP
    requirements:
        virtualbinding: VDU1
        virtualLink: VL1
CP3
    type: tosca.nodes.nfv.CP
    requirements:
        virtualbinding: VDU2
        virtualLink: VL1
```

In other words, the VL1 connects the VDU1 and the VDU2 by using the connection point CP1 on the VDU1 and the connection point CP3 on the VDU2.

Step 515. The VNFM sends a VL instantiation request to the VIM, where the VL instantiation request includes the node information and the deployment information of the VL node.

Step 516. The VIM receives the VL instantiation request sent by the VNFM, creates a VL instance based on the node information and the deployment information of the VL node that are in the VL instantiation request, and returns an instantiation success response to the VNFM.

That a VIM instantiates a VL depending on node information and deployment information is a technology commonly known to persons skilled in the art and is not described in detail in this embodiment of the present invention.

Step 517. The VNFM obtains external connection point information based on the deployment flavour description information corresponding to the first deployment flavour identifier.

For example, as shown in the substitution_mappings part in the VNFD described in the code (2):
  get_DSL:[(get_input: deployment_flavour),External_CP_1
  get_DSL:[(get_input:deployment_flavour),External_CP_2

The VNFM learns according to the DF1 that, in the DF1, a connection point corresponding to the corresponding external connection point External_CP_1 is the CP4, and a connection point corresponding to the external connection point External_CP_2 is the CP2, and requests the VIM that the CP4 and the CP2 be used to connect to corresponding external networks.

Step 518. The VNFM sends, to the VIM, an external connection point instantiation request.

The external connection point instantiation request includes the external connection point information.

Step 519. The VIM receives the external connection point instantiation request sent by the VNFM, uses the external connection point information to connect to an external network, and returns an instantiation success response to the VNFM.

It should be noted that step 517 to step 519 are not mandatory. In particular, when a deployed VNF does not need to be connected to an external network, step 517 to step 519 may be omitted.

Step 520. The VNFM receives the instantiation success response returned by the VIM, and returns a VNF instantiation success response to the NFVO.

Step 521. The NFVO receives the VNF instantiation success response returned by the VNFM, and returns the VNF instantiation success response to the initiator.

It should be noted that, after deploying VNF instances depending on deployment flavour identifiers and VNFDs, the NFV system may maintain current deployment flavour information of each VNF instance on any entity in the NFV system. The current deployment flavour information is used to indicate a deployment flavour, in the VNFD, based on which the VNF instance is deployed.

In a possible design, the NFVO is responsible for maintaining the current deployment flavour information of each VNF instance. Specifically, in step 508, after receiving the VNF instantiation request sent by the initiator, the NFVO stores the VNF instance identifier and the deployment flavour identifier as a deployment record, and sets a status of the deployment record to an inactive state (inactive); after receiving the instantiation success response sent by the VNFM in step 521, the NFVO sets the status of the deployment record to an active state (active); and optionally, after receiving an instantiation failure response sent by the VNFM, the NFVO deletes the deployment record. Subsequently, when the NFVO receives a request sent by another entity for querying current deployment flavour information of a VNF, the NFVO may query deployment records in the active state based on a VNF instance identifier to obtain a corresponding deployment flavour identifier.

In another possible design, the VNFM is responsible for maintaining the current deployment flavour information of each VNF instance. Specifically, in step 509, after receiving the instantiation request sent by the NFVO, the VNFM stores the VNF instance identifier and the deployment flavour identifier as a deployment record, and sets a status of the deployment record to inactive (inactive); and after receiving the instantiation success response sent by the VIM in step 520, the VIM sets the status of the deployment record to active (active). Subsequently, when the VNFM needs to query current deployment flavour information of a VNF, the VNFM may query deployment records in the active state based on a VNF instance identifier to obtain a corresponding deployment flavour identifier.

In this embodiment of the present invention, description information of deployment flavours are added to the VNFD. Specifically, to-be-deployed nodes and deployment information for different deployment flavours are defined, and a deployment flavour identifier is added to an instantiation request. When receiving an instantiation request, the VNFM determines a to-be-deployed node and deployment information based on a deployment flavour identifier in the instantiation request, and sends the to-be-deployed node and the deployment information to the VIM for the VIM to perform an instantiation operation. In this way, a service requirement that a same VNFD supports a plurality of deployment flavours can be implemented, providing a more flexible service deployment method. In addition, because different deployment methods are based on a same deployment template, the initiator does not need to repeat registration on the NFVO, and the VNFM does not need to obtain a plurality of deployment templates from the NFVO, either. This lowers service deployment complexity.

Figure 6:
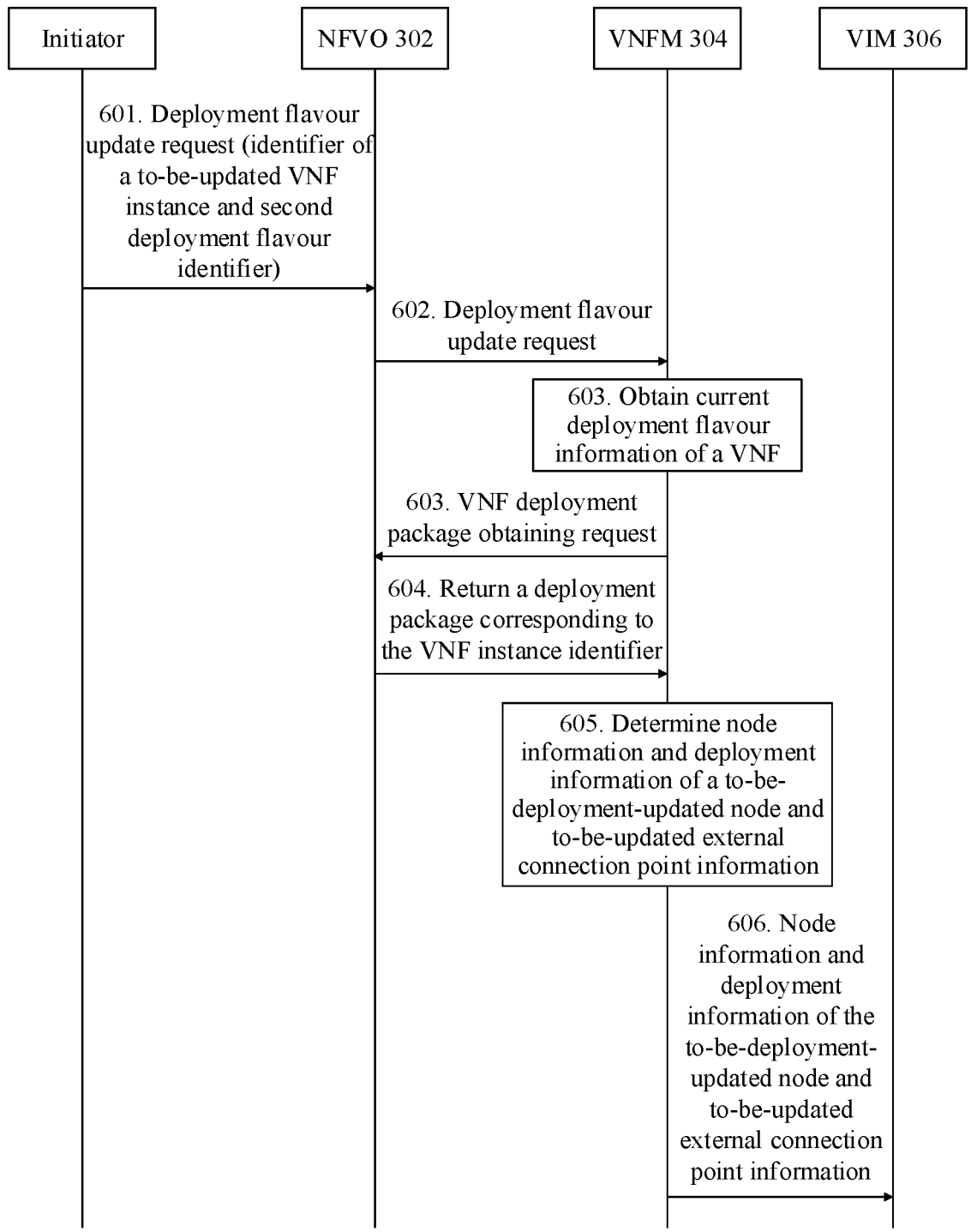
FIG. 6 is a flowchart of a method for switching between different deployment flavours according to an embodiment of the present invention.

In an actual running process, after VNF instantiation, a current VNF deployment flavour sometimes needs to be updated depending on a running requirement. FIG. 6 is a flowchart of a method for switching between different deployment flavours according to an embodiment of the present invention.

For example, the VNFD described in the code (2) is still used as an example in the embodiment of FIG. 6. In the embodiment described in FIG. 5A and FIG. 5B, the system has already instantiated the VNF based on the DF1, and the VNF deployment flavour is updated to the DF2 in the method in the embodiment described in FIG. 6. Specifically, the method includes the following steps.

Step 601. An initiator sends a deployment flavour update request to an NFVO.

The deployment flavour update request includes an identifier of a to-be-updated VNF instance and a second deployment flavour identifier. In this example, the to-be-updated VNF instance is the VNF instantiated in the embodiment described in FIG. 5A and FIG. 5B, and the second deployment flavour identifier is DF2.

Step 602. The NFVO receives the deployment flavour update request sent by the initiator, and sends the received deployment flavour update request to a VNFM.

Step 603. The VNFM receives the deployment flavour update request sent by the NFVO, obtains current deployment flavour information of a VNF based on a VNF instance identifier in the deployment flavour update request, and sends a VNF deployment package obtaining request to the NFVO.

The VNF deployment package obtaining request includes the identifier of the to-be-updated VNF instance.

The VNFM may use different methods to obtain the current deployment flavour information of the VNF. This is not limited in the present invention. For example, the method in the embodiment described in FIG. 5A and FIG. 5B may be used to obtain the current deployment flavour information of the VNF. In this embodiment of the present invention, the current deployment flavour information of the VNF is the first deployment flavour identifier, namely, DF1.

Step 604. The NFVO receives the deployment package obtaining request sent by the VNFM, obtains a deployment package corresponding to the VNF instance identifier, and returns the obtained deployment package to the VNFM.

Step 605. The VNFM determines node information and deployment information of a to-be-deployment-updated node and to-be-updated external connection point information based on the current deployment flavour information of the VNF, the second deployment flavour identifier, and the VNFD in the deployment package.

Specifically, the VNFM determines, based on the second deployment flavour identifier and the VNFD, a to-be-deployed node and external connection point information that are corresponding to the second deployment flavour identifier; determines, based on the first deployment flavour identifier and the VNFD, a to-be-deployed node and external connection point information that are corresponding to the first deployment flavour identifier; determines the to-be-deployment-updated node and the to-be-updated external connection point information; obtains the node information of the to-be-deployment-updated node; and determines the corresponding deployment information of the to-be-deployment-updated node based on deployment flavour description information corresponding to the second deployment flavour identifier.

The to-be-deployment-updated node includes a node that needs to be added to or deleted from a first deployment flavour to obtain a second deployment flavour.

In this embodiment of the present invention, the to-be-deployed nodes corresponding to the first deployment flavour include the VDU1, the VDU2, and the VL1, and the external connection point information is the CP4 and the CP2; and the to-be-deployed nodes corresponding to the second deployment flavour include the VDU1, the VDU2, the VDU3, the VL1, and the VL2, and the external connection point information is the CP4 and the CP6. Therefore, the to-be-deployment-updated nodes are the nodes VDU3 and VL2 to be added, the to-be-updated external connection point information is the CP6. That is, the CP6 is used in place of the CP2 as an external connection point to connect to an external network.

Step 606. The VNFM sends the determined node information and deployment information of the to-be-deployment-updated node and the to-be-updated external connection point information to a virtualized infrastructure manager VIM for the VIM to perform an instantiation operation.

That a VIM performs an instantiation operation depending on information sent by a VNFM is a technology commonly known to persons skilled in the art and is not described in detail herein.

After successfully updating a deployment based on the node information and the deployment information of the to-be-deployment-updated node and the to-be-updated external connection point information that are sent by the VNFM, the VIM returns a VNF instantiation success response to the VNFM. The VNFM sends a deployment flavour update success response to the NFVO, and the NFVO further forwards the deployment flavour update success response to the initiator.

In a possible design, to reduce impact on a current service as much as possible, a node update policy may be set to minimize an interruption time of the current service.

In a possible design, that the VNFM sends the determined node information and deployment information of the to-be-deployment-updated node and the to-be-updated external connection point information to a virtualized infrastructure manager VIM is specifically that the VNFM sends the node information and the deployment information of the to-be-deployment-updated node and the to-be-updated external connection point information in sequence to the VIM according to the preset node update policy.

For example, when a current deployment flavour is the DF1, it can be learned from the VFND described in the code (2) that the current service is provided by these three nodes: the VDU1, the VDU2, and the VL1. Specifically, the VL1 node connects the VDU1 and the VDU2 by using the CP1 on the VDU1 and the CP3 on the VDU2, communicates with the external network External_VL2 by using the CP2 on the VDU1, and communicates with the external network External_VL1 by using the CP4 on the VDU2. When the deployment flavour DF1 needs to be updated to the DF2, the to-be-deployment-updated nodes are nodes that need to be added (the nodes VDU3 and VL2 need to be added). A node that has no connection to a node in the current deployment flavour is first deployed, for example, the VDU3 node in this embodiment. Then, a node that has a connection to a node in the current deployment flavour is deployed, for example, the VL2 in this embodiment of the present invention. Because this node has a connection to a node in the current deployment flavour, the corresponding connection in the current deployment flavour needs to be released before deployment of the node. For example, the CP2 in the VDU1 needs to be used during deployment of the VL2. However, in the current deployment flavour DF1, the CP2 acts as an external connection point to connect to the external network External_VL2. Therefore, before the VL2 is deployed, it is necessary to release the CP2 node and connect the CP6 to the external network External_VL2.

For another example, when a current deployment flavour is the DF2, it can be learned from the VFND described in the code (2) that the current service is provided by these five nodes: the VDU1, the VDU2, the VDU3, the VL1, and the VL2. Specifically, the VL1 node connects the VDU1 and the VDU2 by using the connection point CP1 on the VDU1 and the CP3 on the VDU2; the VL2 node connects the VDU1 and the VDU3 by using the connection point CP2 on the VDU1 and the CP5 on the VDU3, communicates with the external network External_VL2 by using the CP6 on the VDU3, and communicates with the external network External_VL1 by using the CP4 on the VDU2. When the deployment flavour DF2 needs to be updated to the DF1, the to-be-deployment-updated nodes are nodes that need to be deleted (the nodes VDU3 and VL2 need to be deleted). It is determined whether the nodes to be deleted include an external connection point in the current deployment flavour. If no, all the nodes to be deleted are released. If yes, external connection points of the to-be-updated-to deployment flavour DF1 are obtained from the VNFD, a to-be-updated external connection point is determined, and it is determined whether the to-be-updated external connection point is available. If the to-be-updated external connection point is unavailable, a VL node connected to the to-be-updated external connection point is first released, then a connection is established between the to-be-updated external connection point and an external network, and finally the remaining node to be deleted is released. Specifically, it can be learned from the VFND described in the code (2) that external connection points of the current deployment flavour DF2 are the CP4 and the CP6, nodes to be deleted are the VDU3 and the VL2, and the VDU3 includes the external connection point CP6 of the current deployment flavour DF2. It can be learned from the VFND described in the code (2) that the external connection points of the to-be-updated-to deployment flavour DF1 are the CP4 and the CP2, the external connection point CP4 does not change, the CP2 is a to-be-updated external connection point, and the to-be-updated external connection point CP2 is unavailable. In this case, the VL2 connected to the CP2 needs to be first released, then the CP2 is connected to the external network External_VL2, and finally the VDU3 is released.

This embodiment of the present invention provides a method for switching between deployment flavours. One deployment template is used to implement different service deployments, improving flexibility of virtualized service deployment and saving deployment template resources. Compared with the prior art in which a plurality of deployment templates are required to implement different service deployments, the method in this embodiment of the present invention can be used to reduce the interruption time of the current service during deployment switching.

Figure 7:
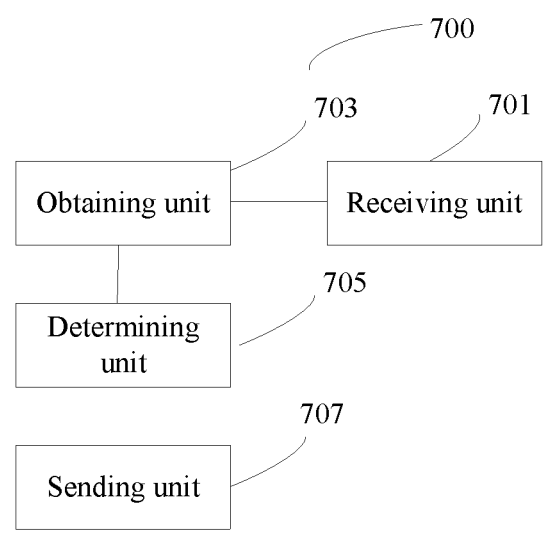
FIG. 7 is a schematic structural diagram of a virtualized network function manager according to an embodiment of the present invention.

In an embodiment of the present invention, a schematic structural diagram of a virtualized network function manager whose invention idea is the same as that of the method embodiments described in FIG. 5A, FIG. 5B, and FIG. 6 is described. As shown in FIG. 7, the virtualized network function manager 700 is configured to implement the functions of the VNFM in the foregoing method embodiments of FIG. 5A, FIG. 5B, and FIG. 6, and includes a receiving unit 701, an obtaining unit 703, a determining unit 705, and a sending unit 707.

The receiving unit 701 is configured to receive an instantiation request, where the instantiation request includes deployment package information corresponding to VNF instance identifier and a first deployment flavour identifier; the obtaining unit 703 is configured to obtain, based on the VNF instance identifier, a VNF deployment template VNFD corresponding to the VNF instance identifier, where the VNFD includes description information of at least two potential deployment nodes and description information of at least two deployment flavours, description information of each potential deployment node in the description information of the at least two potential deployment nodes includes an identifier, node information, and a deployment condition of the potential deployment node, and description information of each deployment flavour in the description information of the at least two deployment flavours includes a node identifier and deployment information of a to-be-deployed node corresponding to the deployment flavour; the determining unit 705 is configured to determine, based on the first deployment flavour identifier and the VNFD, node information and deployment information of a to-be-deployed node corresponding to the first deployment flavour identifier; and the sending unit 707 is configured to send the determined node information and deployment information of the to-be-deployed node to a virtualized infrastructure manager VIM.

In a possible implementation, the deployment condition includes a deployment identifier, and the determining unit 705 is specifically configured to: for the description information of each potential node in the description information of the at least two potential deployment nodes, compare the first deployment flavour identifier with the deployment identifier included in the deployment condition of the potential deployment node; when the first deployment flavour identifier matches the deployment identifier included in the deployment condition of the potential deployment node, determine the potential deployment node as the to-be-deployed node; obtain the node information of the to-be-deployed node; obtain deployment flavour description information, in the VNFD, corresponding to the first deployment flavour identifier; and determine the deployment information of the to-be-deployed node based on the deployment flavour description information corresponding to the first deployment flavour identifier.

Optionally, the receiving unit 701 is further configured to receive a deployment flavour update request, where the deployment flavour update request includes the VNF instance identifier and a second deployment flavour identifier; the obtaining unit 703 is further configured to obtain the VNFD based on the VNF instance identifier; the determining unit 705 is further configured to determine the second deployment flavour identifier, and the VNFD, node information and deployment information of a to-be-deployment-updated node based on the first deployment flavour identifier; and the sending unit 707 is further configured to send the node information and the deployment information, determined by the determining unit 705, of the to-be-deployment-updated node to the virtualized infrastructure manager VIM. The determining unit 705 is specifically configured to: determine, based on the second deployment flavour identifier and the VNFD, a to-be-deployed node corresponding to the second deployment flavour identifier; determine, based on the first deployment flavour identifier and the VNFD, the to-be-deployed node corresponding to the first deployment flavour identifier; determine the to-be-deployment-updated node; obtain the node information of the to-be-deployment-updated node; and determine the deployment information of the to-be-deployment-updated node based on deployment flavour description information corresponding to the second deployment flavour identifier.

In this embodiment, the virtualized network function manager 700 is presented in a form of a functional unit. Herein, the "unit" may be an application-specific integrated circuit (application-specific integrated circuit, ASIC), a circuit, a processor and a memory that execute one or more software or firmware programs, an integrated logic circuit, and/or another component that can provide the foregoing functions. In a simple embodiment, persons skilled in the art may envision that the form shown in FIG. 4 may be used for the virtualized network function manager 700. The receiving unit 701, the obtaining unit 703, the determining unit 705, and the sending unit 707 may be implemented by using the processor and the memory in FIG. 4.

An embodiment of the present invention further provides a computer storage medium, configured to store computer software instructions for the virtualized network function manager shown in FIG. 7. The computer storage medium includes a program designed for implementing the foregoing method embodiments. The stored program is executed to implement a service requirement that a same VNFD supports a plurality of deployment flavours, providing a more flexible service deployment method, and lowering service deployment complexity.

It should be noted that, to make the description brief, the foregoing method embodiments are expressed as a series of actions. However, persons skilled in the art should appreciate that the present invention is not limited to the described action sequence, because according to the present invention, some steps may be performed in other sequences or performed simultaneously. In addition, persons skilled in the art should also appreciate that all the embodiments described in the specification are example embodiments, and the related actions and modules are not necessarily mandatory to the present invention.

Although the present invention is described with reference to the embodiments, in a process of implementing the present invention that claims protection, persons skilled in the art may understand and implement a variation of the disclosed embodiments by referencing the accompanying drawings, the disclosure content, and the accompanying claims. In the claims, "comprising" (comprising) does not exclude another component or another step, and "a" or "one" does not exclude a plurality. One processor or another unit may implement several functions enumerated in the claims. Some measures are recorded in dependent claims that are different from each other, but this does not mean that these measures cannot be combined to produce a good effect.

Persons skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with another hardware, or may also use another allocation form, such as by using the Internet or another wired or wireless telecommunications system.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present invention is described with reference to specific features and the embodiments thereof, obviously, various modifications and combinations may be made to them without departing from the spirit and scope of the present invention. Correspondingly, the specification and accompanying drawings are merely example description of the present invention defined by the accompanying claims, and is considered as any of or all modifications, variations, combinations or equivalents that cover the scope of the present invention. Obviously, persons skilled in the art can make various modifications and variations to the present invention without departing from the scope of the present invention. The present invention is intended to cover these modifications and variations provided that they fall within the scope of protection defined by the following claims and their equivalent technologies.

What is claimed is:

1. A method for deploying a service in a virtualized network, comprising:

receiving an instantiation request, wherein the instantiation request comprises a virtualized network function (VNF) instance identifier and a first deployment flavour identifier;

obtaining a VNF deployment template (VNFD) corresponding to the VNF instance identifier, wherein the VNFD comprises description information of at least two potential deployment nodes and description information of at least two deployment flavours, description information of each potential deployment node in the description information of the at least two potential deployment nodes comprises node information and a deployment condition of the potential deployment node, and description information of each deployment flavour in the description information of the at least two deployment flavours comprises deployment information of a to-be-deployed node corresponding to the deployment flavour;

determining, based on the first deployment flavour identifier and the VNFD, node information and deployment information of a to-be-deployed node corresponding to the first deployment flavour identifier; and sending the determined node information and deployment information of the to-be-deployed node to a virtualized infrastructure manager.

2. The method according to claim 1, wherein the deployment condition comprises a deployment identifier, and the determining, based on the first deployment flavour identifier and the VNFD, node information and deployment information of a to-be-deployed node corresponding to the first deployment flavour identifier comprises:

for the description information of each potential node in the description information of the at least two potential deployment nodes, comparing the first deployment flavour identifier with the deployment identifier comprised in the deployment condition of the potential deployment node;

if the first deployment flavour identifier matches the deployment identifier comprised in the deployment condition of the potential deployment node, determining the potential deployment node as the to-be-deployed node;

obtaining the node information of the to-be-deployed node;

obtaining deployment flavour description information, in the VNFD, corresponding to the first deployment flavour identifier; and determining the deployment information of the to-be-deployed node based on the deployment flavour description information corresponding to the first deployment flavour identifier.

3. The method according to claim 1, wherein the method further comprises:

receiving a deployment flavour update request, wherein the deployment flavour update request comprises the VNF instance identifier and a second deployment flavour identifier;

obtaining the VNFD based on the VNF instance identifier;

determining node information and deployment information of a to-be-deployment-updated node based on the first deployment flavour identifier, the second deployment flavour identifier, and the VNFD; and sending the determined node information and deployment information of the to-be-deployment-updated node to the virtualized infrastructure manager.

4. The method according to claim 3, wherein the determining node information and deployment information of a to-be-deployment-updated node based on the first deployment flavour identifier, the second deployment flavour identifier, and the VNFD comprises:
    determining, based on the second deployment flavour identifier and the VNFD, a to-be-deployed node corresponding to the second deployment flavour identifier;
    determining, based on the first deployment flavour identifier and the VNFD, the to-be-deployed node corresponding to the first deployment flavour identifier;
    determining the to-be-deployment-updated node;
    obtaining the node information of the to-be-deployment-updated node; and
    determining the deployment information of the to-be-deployment-updated node based on deployment flavour description information corresponding to the second deployment flavour identifier.

5. The method according to claim 1, wherein the node comprises a virtualization deployment unit, VDU, or a virtual link VL; and
    the deployment information comprises scaling parameters of the VDU or quality of service parameters of the VL.

6. An apparatus for deploying a service in a virtualized network, comprising:
    at least one processor;
    a non-transitory computer-readable storage medium coupled to the at least one processor and storing programming instructions for execution by the at least one processor, wherein the programming instructions instruct the at least one processor to:
        receive an instantiation request, wherein the instantiation request comprises deployment package information corresponding to a virtualized network function (VNF) instance identifier and a first deployment flavour identifier;
        obtain, based on the VNF instance identifier, a VNF deployment template (VNFD) corresponding to the VNF instance identifier, wherein the VNFD comprises description information of at least two potential deployment nodes and description information of at least two deployment flavours, description information of each potential deployment node in the description information of the at least two potential deployment nodes comprises node information and a deployment condition of the potential deployment node, and description information of each deployment flavour in the description information of the at least two deployment flavours comprises deployment information of a to-be-deployed node corresponding to the deployment flavour;
        determine, based on the first deployment flavour identifier and the VNFD, node information and deployment information of a to-be-deployed node corresponding to the first deployment flavour identifier; and
        send the determined node information and deployment information of the to-be-deployed node to a virtualized infrastructure manager (VIM).

7. The apparatus according to claim 6, wherein the deployment condition comprises a deployment identifier, and the programming instructions instruct the at least one processor to:
    for the description information of each potential node in the description information of the at least two potential deployment nodes, compare the first deployment flavour identifier with the deployment identifier comprised in the deployment condition of the potential deployment node;
    if the first deployment flavour identifier matches the deployment identifier comprised in the deployment condition of the potential deployment node, determine the potential deployment node as the to-be-deployed node;
    obtain the node information of the to-be-deployed node;
    obtain deployment flavour description information, in the VNFD, corresponding to the first deployment flavour identifier; and
    determine the deployment information of the to-be-deployed node based on the deployment flavour description information corresponding to the first deployment flavour identifier.

8. The apparatus according to claim 6, wherein the programming instructions instruct the at least one processor to:
    receive a deployment flavour update request, wherein the deployment flavour update request comprises the VNF instance identifier and a second deployment flavour identifier;
    obtain the VNFD based on the VNF instance identifier;
    determine node information and deployment information of a to-be-deployment-updated node based on the first deployment flavour identifier, the second deployment flavour identifier, and the VNFD; and
    end the determined node information and deployment information of the to-be-deployment-updated node to the virtualized infrastructure manager (VIM).

9. The apparatus according to claim 8, wherein the programming instructions instruct the at least one processor to:
    determine, based on the second deployment flavour identifier and the VNFD, a to-be-deployed node corresponding to the second deployment flavour identifier;
    determine, based on the first deployment flavour identifier and the VNFD, the to-be-deployed node corresponding to the first deployment flavour identifier;
    determine the to-be-deployment-updated node;
    obtain the node information of the to-be-deployment-updated node; and
    determine the deployment information of the to-be-deployment-updated node based on deployment flavour description information corresponding to the second deployment flavour identifier.

10. The apparatus according to claim 6, wherein the node comprises a virtualization deployment unit (VDU) or a virtual link (VL); and
    the deployment information comprises scaling parameters of the VDU or quality of service parameters of the VL.

11. A non-transitory, computer-readable medium storing one or more instructions executable by a computer system to perform operations comprising:
    receiving an instantiation request, wherein the instantiation request comprises a virtualized network function (VNF) instance identifier and a first deployment flavour identifier;
    obtaining a VNF deployment template (VNFD) corresponding to the VNF instance identifier, wherein the VNFD comprises description information of at least two potential deployment nodes and description information of at least two deployment flavours, description information of each potential deployment node in the description information of the at least two potential deployment nodes comprises node information and a deployment condition of the potential deployment node, and description information of each deployment flavour in the description information of the at least two deployment flavours comprises deployment information of a to-be-deployed node corresponding to the deployment flavour;

determining, based on the first deployment flavour identifier and the VNFD, node information and deployment information of a to-be-deployed node corresponding to the first deployment flavour identifier; and sending the determined node information and deployment information of the to-be-deployed node to a virtualized infrastructure manager.

* * * * *